United States Patent Office 3,830,833
Patented Aug. 20, 1974

3,830,833
PROCESS FOR ISOMERIZING ALLYLIC ESTERS OF CARBOXYLIC ACID
Shunsuke Mabuchi and Hisashi Kisaki, Yamaguchi, Japan, assignors to Toya Soda Manufacturing Co., Ltd., Yamaguchi, Japan
No Drawing. Filed June 29, 1971, Ser. No. 158,131
Claims priority, application Japan, July 8, 1970, 45/59,644
Int. Cl. C07c 67/00, 79/46
U.S. Cl. 260—491                                  8 Claims

ABSTRACT OF THE DISCLOSURE

Allylic esters of carboxylic acid in the liquid phase are isomerized by contact with platinum chlorine compounds.

BACKGROUND OF THE INVENTION

Field of the Invention

This invention relates to isomerization of allylic esters of carboxylic acid by contacting said allylic esters of carboxylic acid with platinum chlorine compounds.

Description of Prior Art

The isomerization of allylic esters of carboxylic acid is a reaction which has been systematically studied by numerous research workers, including Burton and Ingold. Their studies were confined, however, to isomerization using various solvents with acid catalysts or without catalysts, and there seems to be very little reported in the literature using metal or metal compounds as catalysts.

One recent report discussed mutual isomerization between 1,4-diacetoxy-2-butene and 3,4-diacetoxy-1-butene using palladium compounds as catalysts in an acetic acid solvent (cf. Sakae Uemura, Tetsuo Hiramoto, and Katsuhiko Ichikawa, Kogyo Kagaku Zasshi, 72 (5), 1096 (1969)). In general, however, similar reactions occur in solvents having high dielectric constant and employing acid-catalyst.

None of the reported isomerization catalysts, however, are characterized by sufficiently high activity to make them completely industrially acceptable.

SUMMARY OF THE INVENTION

Accordingly it is one object of this invention to provide an isomerization process for allylic esters of carboxylic acid which uses a high activity catalyst.

This and other objects as will hereafter become more apparent, have been attained by the use of platinum compounds of chlorine, which have been found to possess very superior catalytic activity for the isomerization of allylic esters of carboxylic acid.

DETAILED DESCRIPTION OF THE INVENTION

Suitable platinum compounds of chlorine, useful herein, include chloroplatinic acid, platinous chloride, supported chloroplatinic acid, such as chloroplatinic acid supported on activated carbon or activated alumina; alkali metal salts of chloroplatinic acid, such as the corresponding sodium and potassium salts; and the like.

A wide variety of allylic esters of carboxylic acid can be isomerized by the present technique. For instance, isomerization can be successfully accomplished with 1,4-diacetoxy-2-butaene, 3,4-diacetoxy-1-butene, 3-acetoxy-1-butene, linalyl acetate and 3-phenylallyl-p-nitrobenzoate, which are mentioned as being exemplary only.

The reaction can be conducted in a solvent containing system or in a solventless system. When a solvent is used, such solvents as acetic acid, have been found to be acceptable.

The temperature of the reaction may vary from room temperature to 230° C. and preferably from 100° C. to 150° C. If the temperature is too low, the rate of reaction will be decreased somewhat, and if it is too high, the extent of undesirable by-products formation will be increased.

If the isomer being produced has a lower boiling point, it can continuously be removed by distillation as the reaction proceeds. On the other hand, when the isomer being produced has a higher boiling point, it can be separated and recovered by fractional distillation after removing the catalyst, such as by filtration, once the composition has reach equilibrium.

When the catalyst is completely reduced to metallic platinum, it loses its activity for isomerization purposes. Since the platinum compounds used in this invention are quite easily reduceable, as are most platinum group metal compounds, the temperature of the isomerization reaction should be not higher than that actually necessary to complete the reaction, in order to minimize the extent of catalyst reduction.

A re-oxidizing agent, such as cupric chloride or ferric chloride etc., may be included in minor amounts, in the reaction system, to offset the tendency of the catalyst to be reduced and inactivated. The use of such re-oxidizing agents, therefore, tend to prolong the catalyst life.

The first notable characteristic of the platinum compound catalysts used in this invention is that they are characterized by very high catalytic activity. For instance, when 0.5% by weight chloroplatinic acid was compared with 2% by weight of sulfuric acid, each in an acetic acid solvent, it was found that it required 20 hours for equilibrium to be attained using sulfuric acid, whereas it required only 30 minutes for equilibrium to be attained using chloroplatinic acid.

The second characteristic of the catalyst of this invention is its high selectivity. Because of the high activity of the catalyst, the isomerization reaction will proceed under moderate conditions, virtually without any side reactions. For instance, when 0.15% by weight of chloroplatinic acid was used to isomerize 3,4-diacetoxy-1-butene, the reaction was carried out without using any solvent at 50° C., and equilibrium was reached in about 6 hours. The total recovery of 1,4-diacetoxy-2-butene and 3,4-diacetoxy-1-butene was 98%.

The third notable characteristic of the catalyst used in this invention is the comparative ease in handling and recovery. The chlorine compounds of platinum can be used alone or may be used in the form of a supported catalyst using a porous carrier, such as activated carbon or activated alumina, etc., without serious decrease in activity. By selecting an appropriate support and by proper adjustment of the amount of the catalyst, the platinum compound catalysts of this invention can be used as solid catalysts, which makes it possible to separate the catalyst from the reaction system very easily, for instance, by filtration.

Having generally described the invention, a further understanding can be attained by reference to certain specific examples, which are included herein for purposes of illustration only and are not intended to be limiting unless otherwise specifically specified.

EXAMPLE 1

5 g. of 1,4-diactoxy-2-butene, 5 g. of acetic acid and 50 mg. of chloroplatinic acid were placed in a conical flask of 50 ml. capacity, equipped with a reflux condenser. The flask was immersed in a constant temperature oil bath at 100° C., which was stirred for 30 minutes using a magnetic stirrer. The flask was then cooled and its contents were analyzed by gas chromatography without separation. The ratio of 1,4-diacetoxy-2-butene to 3,4-diacetoxy-1-butene was 1.9.

EXAMPLE 2

5 g. of 3,4-diacetoxy-1-butene was placed in a similar apparatus as in Example 1 and 0.1 g. of chloroplatinic acid was added. The reaction was conducted at 100° C. for 3 hours.

Analytical result of the reaction liquor by gas chromatography showed the ratio of 1,4-diacetoxy-2-butene to 3,4-diacetoxy-1-butene to be 1.9.

EXAMPLE 3

0.1 g. of platinous chloride and 5 g. of 3-acetoxy-1-butene were added to a similar apparatus as in Example 1, and held at 100° C. for 30 minutes. Analysis of the reaction liquor showed the ratio of 1-acetoxy-2-butene to 3-acetoxy-1-butene to be 1.4.

EXAMPLE 4

1 g. of catalyst (10 wt. percent chloroplatinic acid supported on activated carbon) and 5 g. of 1,4-diacetoxy-2-butene were added to a similar apparatus as in Example 1, and stirred at 150° C. for 3 hours. Analytical result of the reaction liquor by gas chromatography showed the ratio of 1,4-diacetoxy-2-butene to 3,4-diacetoxy-1-butene to be 1.7.

EXAMPLE 5

0.01 g. of platinous chloride was added to 5 g. of 1,4-diacetoxy-2-butene in a similar apparatus to that used in Example 1. The mixture was stirred at 230° C. for 1 hour. Reduced platinum was found to have deposited partly in the reaction liquor, but analysis of the liquor by gas chromatography showed the ratio of 1,4-diacetoxy-2-butene to 3,4-diacetoxy-1-butene to be 1.4.

According to the internal standard method, the total recovery of 3,4-diacetoxy-1-butene and 1,4-diacetoxy-2-butene was 93% and the reaction by-product was 7%.

EXAMPLE 6

0.05 g. of chloroplatinic acid was added to 5 g. of 1,4-diacetoxy-2-butene and stirred at 50° C. for 1 hour. The result of analysis showed the ratio of 1,4-diacetoxy-2-butene to 3,4-diacetoxy-1-butene to be 2.0.

EXAMPLE 7

0.01 g. of potassium salt of chloroplatinic acid was added to 5 g. of 1,4-diacetoxy-2-butene and stirred at 230° C. for 1 hour. Analysis of the reaction liquor showed the ratio of 1,4-diacetoxy-2-butene to 3,4-diacetoxy-1-butene to be 1.7.

EXAMPLE 8

0.01 g. of sodium salt of chloroplatinic acid was added to 5 g. of 3,4-diacetoxy-1-butene and stirred at 230° C. for 1 hour. Analysis of the reaction liquor showed the ratio of 1,4-diacetoxy-2-butene to 3,4-diacetoxy-1-butene to be 1.5.

EXAMPLE 9

1 g. of the same catalyst employed as in Example 4 was added to 5 g. of linalyl acetate and stirred at 100° C. for 3 hours. Analysis of the reaction liquor showed the ratio of geranyl acetate to linalyl acetate to be 0.24.

EXAMPLE 10

50 mg. of chloroplatinic acid was added to 5 g. of 1-phenylallyl-p-nitrobenzoate and was stirred at 150° C. for 3 hours. The result of spectroscopic analysis showed the formation of 3-phenylallyl-p-nitro-benzoate.

Having now fully described the invention, it will be apparent to one of ordinary skill in the art that many changes and modifications can be made thereto without departing from the spirit and scope of the invention.

What is claimed and intended to be covered by Letters Patent is:

1. In a process for the isomerization of allylic esters of carboxylic acids in the liquid phase the improvement which comprises reacting 1,4-diacetoxy-2-butene, 3,4-diacetoxy-1-butene, 3-acetoxy-1-butene, linalyl acetate or 3-phenylallyl p-nitrobenzoate in the presence of a platinum chlorine compound catalyst selected from the group consisting of chloroplatinic acid, platinous chloride and the alkali metal salts thereof at a temperature from room temperature to 230° C.

2. The process of Claim 1, wherein said catalyst is supported on a porous carrier.

3. The process of Claim 2 wherein said carrier is selected from the group consisting of activated carbon and activated alumina.

4. The process of Claim 1, wherein said reaction is conducted in the presence of a solvent.

5. The process of Claim 4 wherein said solvent is acetic acid.

6. In a process for the isomerization of allylic esters of carboxylic acids in the liquid phase the improvement which comprises reacting 1,4-diacetoxy-2-butene, 3,4-diacetoxy-1-butene, 3-acetoxy-1-butene, linalyl acetate or 3-phenylallyl-p-nitrobenzoate in the presence of platinum chlorine compound catalyst selected from the group consisting of chloroplatinic acid, platinous chloride and the alkali metal salts thereof and a reoxidizing agent selected from the group consisting of cupric chloride and ferric chloride at a temperature from room temperature to 230° C.

7. The process of Claim 6, wherein said catalyst is a supported catalyst on a porous carrier selected from the group consisting of activated carbon and activated alumina.

8. The process of Claim 1, wherein 1,4-diacetoxy-2-butene or 3,4-diacetoxy-2-butene is reacted with said platinum chlorine compound.

References Cited

Unemura et al., Kogyo Kagaku Zasshi, 72(5), 1096 (1969).

VIVIAN GARNER, Primary Examiner

U.S. Cl. X.R.

260—471 R, 489